Figure 1:
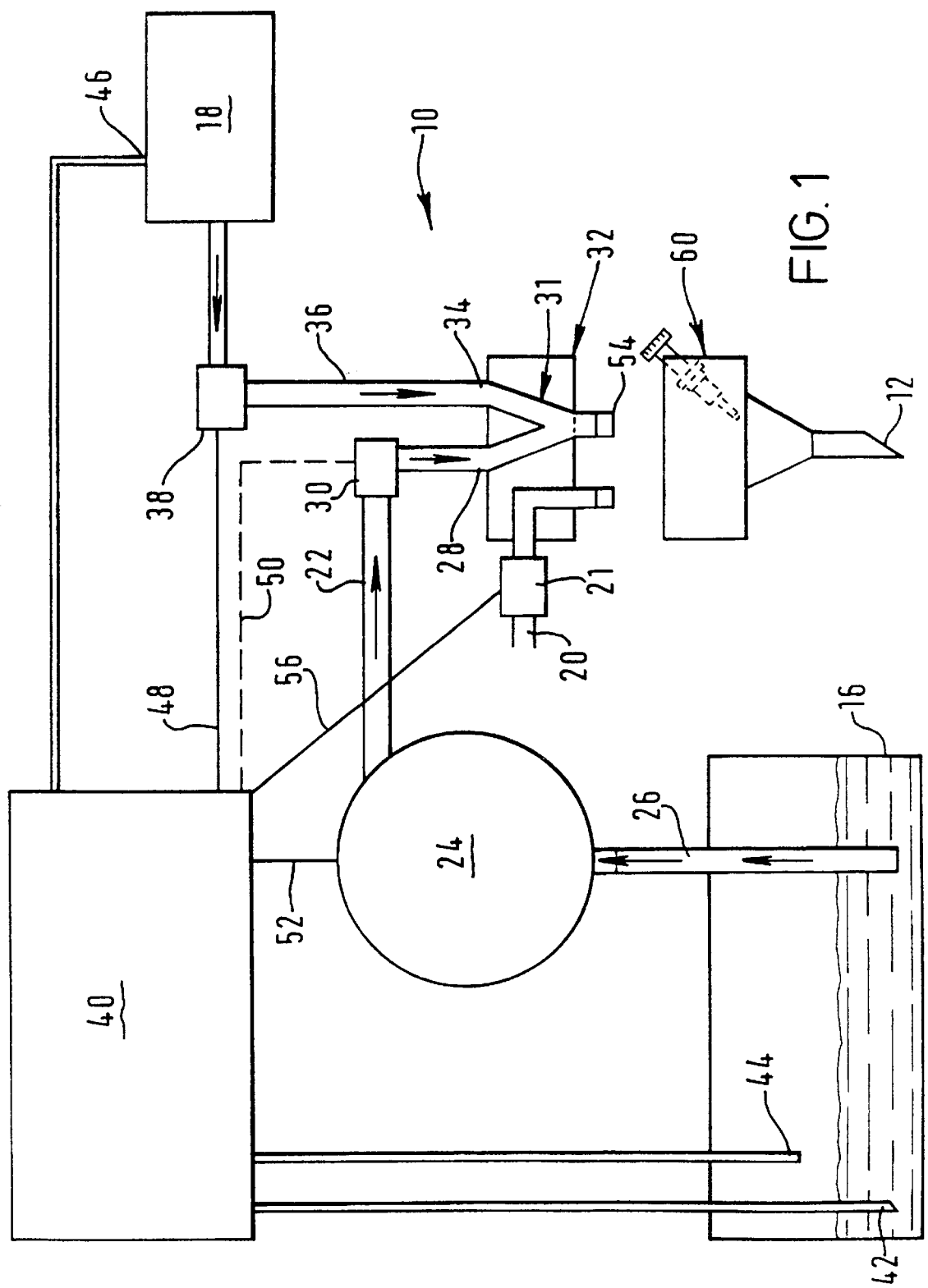

United States Patent [19]
Pugh

[11] Patent Number: 6,006,654
[45] Date of Patent: Dec. 28, 1999

[54] MILK FROTHING APPARATUS AND METHOD

[75] Inventor: Jeffrey R. Pugh, Cockfosters, United Kingdom

[73] Assignee: TCC Trading Limited, London, United Kingdom

[21] Appl. No.: 09/210,457

[22] Filed: Dec. 14, 1998

Related U.S. Application Data

[63] Continuation of application No. PCT/GB97/01603, Jun. 13, 1997.

[51] Int. Cl.$^6$ .............................. A47J 31/40; B01F 3/04; B01F 5/04
[52] U.S. Cl. ............................ 99/293; 99/453; 99/323.1; 261/DIG. 76
[58] Field of Search ................................... 99/293, 323.1, 99/452, 453; 261/DIG. 16, DIG. 76

[56] References Cited

U.S. PATENT DOCUMENTS

| | | |
|---|---|---|
| 4,852,474 | 8/1989 | Mahlich et al. ........................ 99/293 |
| 4,922,810 | 5/1990 | Siccardi ................................ 99/293 X |
| 5,339,725 | 8/1994 | De'Longhi ......................... 99/323.1 X |
| 5,498,757 | 3/1996 | Johnson et al. .................... 99/323.1 X |
| 5,738,002 | 4/1998 | Marano-Ducarne ...................... 99/293 |

FOREIGN PATENT DOCUMENTS

| | | |
|---|---|---|
| B-21799/95 | 2/1996 | Australia . |
| 1299382 | 4/1992 | Canada . |
| 2102732 | 5/1994 | Canada . |
| 157069 | 10/1985 | European Pat. Off. . |
| 195750 | 9/1986 | European Pat. Off. . |
| 243326 | 10/1987 | European Pat. Off. . |
| 326929 | 8/1989 | European Pat. Off. . |
| 344859 | 12/1989 | European Pat. Off. . |
| 472272 | 2/1992 | European Pat. Off. . |
| 600826 | 6/1994 | European Pat. Off. . |

*Primary Examiner*—Reginald L. Alexander
*Attorney, Agent, or Firm*—Pillsbury Madison & Sutro, LLP

[57] ABSTRACT

Apparatus for providing a frothed mixture of milk, air and steam has a mild reservoir, and a steam boiler. A pump draws milk from the milk reservoir and delivers it to an inlet of a Y-connector forming a mixing chamber. A second inlet of the Y-connector is fed with steam. The pump and the steam pressure are controlled such that the milk and steam are substantially of an equal pressure. The milk-steam mix is fed to a jet and exits from its outlet nozzle. The milk-steam mix expands as it exits from the nozzle. Furthermore, the flow of the milk-steam mix draws air into the mix by way of an air inlet conduit whereby a frothed product of milk, air and steam is produced at the nozzle.

14 Claims, 2 Drawing Sheets

MILK FROTHING APPARATUS AND METHOD

This application is a continuation of PCT/GB97/01603 filed Jun. 13, 1997.

The present invention relates to a milk frothing apparatus and method.

In order to produce a variety of hot drinks, for example cappuccino, a charge of frothy milk is required to be delivered to one or more cups, or receptacles. A variety of emulsification systems are known for producing the emulsified milk-air-steam mix. A simple system comprises a steam outlet pipe from which steam can be injected into cold milk which is heated thereby and frothed. However, the ease of operation of such basic apparatus, and successful creation of the required frothed milk, is dependent very much upon the skill of the operator and so such apparatus cannot be effectively widely used.

More recent developments have led to the introduction of automatic emulsification apparatus in which steam is directed towards a so-called emulsification chamber and, during its passage to the emulsification chamber, draws in a supply of milk and air from respective inlets by a venturi effect. The location at which the air inlet and milk inlet open into the steam conduit is generally termed the suction chamber and the milk-air-steam mix produced in the suction chamber is then delivered, by the driving force of the steam, to an emulsification chamber which generally comprises a circular chamber within which the milk-air-steam mix circulates in a turbulent manner so as to further enhance the emulsification thereof.

Such known apparatus is disclosed in European Patent Application-A-0 195 750.

However, all of the known systems and apparatus suffer the disadvantage that the temperature of the frothed milk and the respective ratios in the milk-air-steam mix cannot be readily controlled. A consistent quality of end product can not therefore be readily achieved. Also, known devices are often prone to blockage at the venturi inlet.

The present invention seeks to provide a milk frothing apparatus and method which have advantages over known such apparatus and methods.

According to a first aspect of the present invention there is provided apparatus for frothing milk, said apparatus comprising a mixing chamber having a first inlet for the supply of milk to the mixing chamber, a second inlet for the supply of steam thereto, and an outlet for discharging a milk-steam mix produced in the mixing chamber, and a pump for supplying the milk to the first inlet of the mixing chamber, and said apparatus further comprising a frothing device in communication with said mixing chamber outlet to receive the milk-steam mix discharged from said mixing chamber, said frothing device having an air inlet arranged such that the milk-steam mix applied to the frothing device draws air into the frothing device whereby a frothed mixture of milk, steam and air is formed.

The apparatus is particularly advantageous in that in pumping the milk to said first inlet, the supply of milk is not governed by any form of venturi effect but is positively controlled. Furthermore, controlled quantities of steam and milk can be mixed thereby enabling the milk temperature to be controlled.

In a preferred embodiment, the mixing chamber is defined by the Y-connection of first and second conduits for the milk and the steam.

Preferably, the frothing device comprises a jet through which the milk-steam mix flows, and said air inlet opens at an outlet nozzle of the jet. In this construction, frothed milk is formed at the outlet nozzle of the jet at which the milk-steam mixture expands, air being taken into the mix during the expansion.

Preferably, a frothing chamber is arranged at the outlet nozzle of the jet to receive the expanded and frothed mixture of milk, steam and air.

In a preferred embodiment, means are provided for controlling the temperature and/or pressure of the steam to be supplied to said second inlet of the mixing chamber.

Preferably, means are provided for controlling the speed and/or force of the pump supplying the milk.

In a preferred embodiment, control means are provided for controlling the supply of milk to the mixing chamber and the supply of air to the air inlet. Operation of these control means to prevent the supply of milk and air enables steam applied to the second inlet to be used to clean both the mixing chamber and the frothing device.

It will be appreciated that in operation of frothing apparatus of an embodiment of the invention, the pump may be arranged to pump milk from a milk reservoir. The milk drawn from the milk reservoir is preferably flowed by the pump along a first conduit to the first inlet of the mixing chamber. The first conduit is preferably provided with a valve member for controlling the flow of milk therethrough. The valve member may comprise a solenoid valve.

Similarly, a second conduit for steam is preferably provided and in communication with the second inlet of the mixing chamber. Preferably, the second conduit communicates the outlet of a steam boiler to said second inlet. Advantageously, a valve member is provided in the second conduit for controlling the flow of steam therethrough. This valve member may also comprise a solenoid valve.

The air inlet to the frothing device is preferably connected by way of an air inlet conduit to atmosphere. Preferably, the air inlet conduit is also provided with a valve member for controlling the airflow therethrough. Advantageously, the valve member is a solenoid valve.

As a particular feature of the present invention, one or more of the aforementioned valve members, when provided, may comprise solenoid valve means.

Preferably, said first and second conduits are arranged to converge into a common supply line forming said mixing chamber and delivering the milk-steam mix to said outlet. In particular, said first and second conduits can be arranged to converge in a Y-channel connector or any appropriate form of connector having discrete first and second inlets and a common outlet for delivering said milk-steam mix.

Advantageously, said outlet communicates with a jet for producing a spray of the milk-steam mix as driven by said pump and by steam generation means. To enhance such operation, the pressure developed in the steam generation means, for example, a steam boiler is advantageously balanced with the pressure of the milk supplied by the pump. Also, the size of the jet, is advantageously retained below a determined value so as to maintain the pressure at the outlet nozzle of the jet.

The driving force of the milk-steam mix resulting from the action of said pump and said steam generation means allows the use of said jet as an effective and compact arrangement for providing a controlled spray of the milk-steam mix which expands to produce the required frothed milk, steam and air mixture. As mentioned before, the temperature of the frothed product so provided, and the ratios of the milk-air-steam therein can be controlled even with said compact structure.

Preferably, the frothing chamber associated with the jet outlet is disposed, in use, below said jet outlet. This enhances the simple and effective construction of the milk frothing apparatus.

Furthermore, a froth collection chamber communicating with an outlet tube is disposed, in use, below said frothing chamber.

To further assist the simple and effective operation of the present invention, the passage of said frothed product through said froth collection chamber and the outlet tube to an outlet thereof is arranged to occur under the influence of gravity.

Preferably, frothing apparatus of an embodiment of the invention is provided with microprocessor control means. For example, said control means may control the operation of said pump, of steam generation means and, of any valve means provided.

Sensor means, for example, steam boiler temperature sensor means, milk-level sensor means, and/or milk-temperature sensor means, may be provided for delivering input signals to said control means.

The present invention also extends to a method of frothing milk, the method comprising the steps of pumping milk into a chamber into which steam is delivered to produce a milk-steam mix, and applying said milk-steam mix to a frothing device having an air inlet such that the milk-steam mix draws air into the frothing device whereby a frothed mixture of milk, steam and air is formed.

Preferably, the milk-steam mix is flowed through the frothing device in a manner to provide suction to draw air into the mix to produce the frothed mixture.

The pumping of the milk and the pressure of the steam are preferably controlled to give the required effects. For example, the pressure of the milk supplied and the pressure of the steam may be arranged to be substantially the same.

Preferably, the frothing device comprises a jet through which the milk-steam mix flows to an outlet nozzle at which the mix expands. The air inlet is arranged to open at the outlet nozzle of said jet.

The method preferably comprises the further step of allowing the milk-steam mix to expand whilst drawing air into the mix, and collecting the expanding mixture in a froth collection chamber.

In a preferred embodiment means are provided for controlling the flow of milk, steam and air, and the method further comprises the step of preventing the flow of milk and air, but enabling the flow of steam, whereby the steam acts as a cleaning agent.

Figure 2:
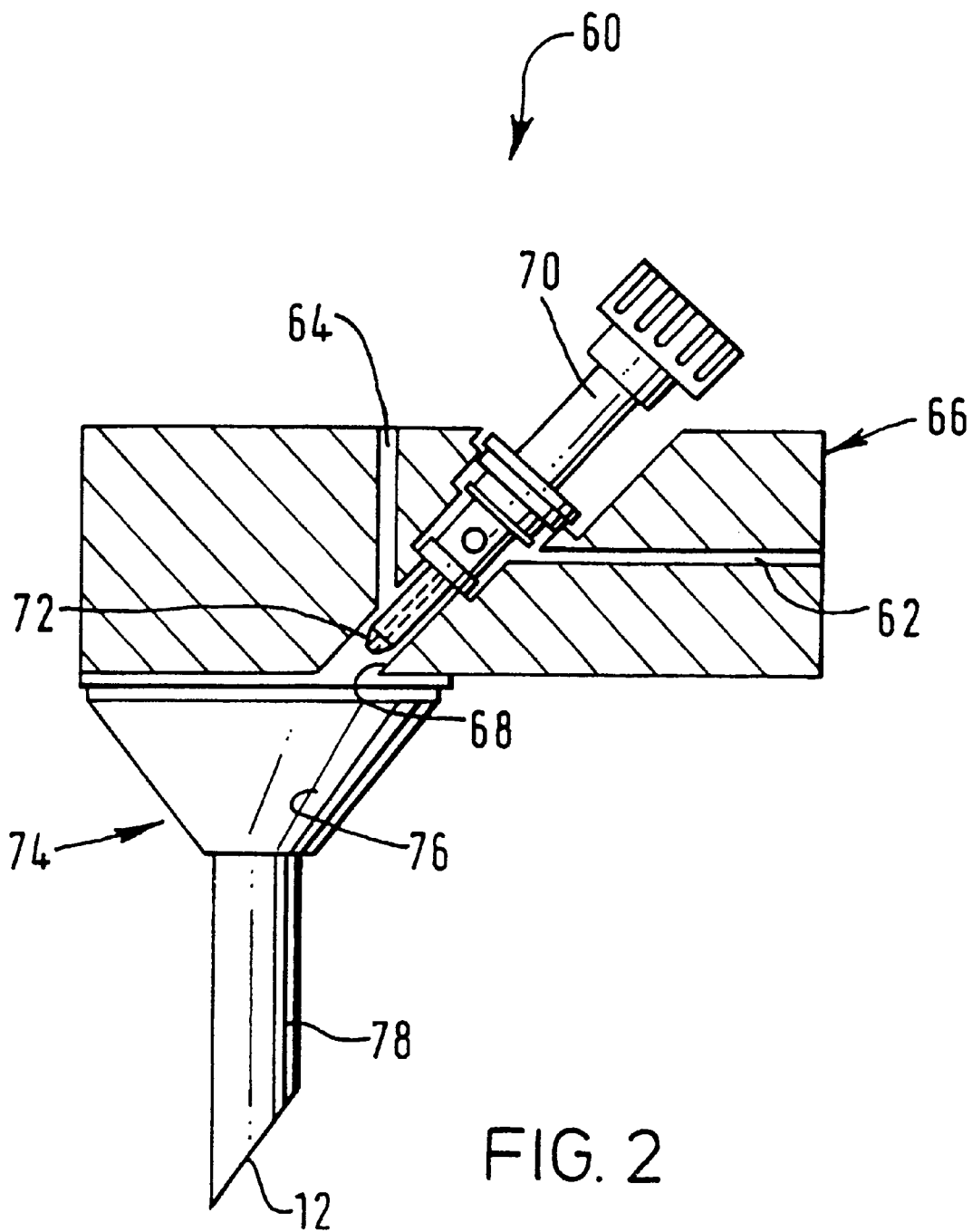

Embodiments of the present invention will hereinafter be described, by way of example, with reference to the accompanying drawings, in which:

FIG. 1 shows a schematic view of milk frothing apparatus embodying the present invention; and FIG. 2 is a schematic view of a frothing device for use in the apparatus of FIG. 1.

FIG. 1 shows a schematic view of a milk frothing apparatus 10 for delivering a charge of frothed milk to a discharge nozzle 12. The frothed milk may be fed to one or more cups, or another suitable receptacle, requiring delivery of frothed milk and arranged at the discharge nozzle 12.

The apparatus 10 is generally arranged to provide a frothed mixture of milk, air and steam and comprises a milk reservoir 16, a steam boiler 18, and an air inlet conduit 20 which opens to atmosphere.

An important feature of the apparatus 10 is a pump 24, for example, an oscillating pump, which is arranged to draw up milk from the milk reservoir 16 by way of a conduit 26 and to deliver the milk to an inlet 28 by way of a first conduit 22. The flow of milk along the first conduit 22 is controlled by a valve 30. In the illustrated example, the valve 30 comprises a solenoid valve. Although illustrated in this example, the solenoid valve 30 is not essential and could be omitted.

As is clear in FIG. 1, the inlet 28 for the milk is a first inlet of a Y-connector 31 forming a mixing chamber and mounted in a mixing block 32. A second inlet 34 of the Y-connector 31 is fed with steam by way of a second conduit 36 communicating the second inlet 34 to the steam boiler 18. The flow of steam along the second conduit 36 is controlled by a valve 38, for example, a solenoid valve.

The overall operation of the apparatus 10 is controlled by a microprocessor controller 40 which is arranged to receive input signals from a milk-level sensor 42, a milk-storage temperature sensor 44, and a steam boiler temperature sensor 46. The microprocessor controller 40 is also arranged to delay the suspension of the supply of a steam after each product delivery so as to assist in the cleaning of the outlet apparatus. Also, the microprocessor controller 40 is arranged to provide control signals to the steam valve 38 by way of a control line 48, to the milk valve 30 by way of a control line 50, and to an air control valve 21 by way of a control line 56. The controller 40 also controls the pump 24 by way of a control line 52.

It will be appreciated that if the milk valve 30 is not provided, the pump 24, when de-activated, serves to prevent the escape of milk from the first conduit 22.

In operation, the milk reservoir 16 is charged with an appropriate supply of milk, and a supply of water is provided in the steam boiler 18 for the generation of an appropriate amount of steam.

The steam boiler 18 and the pump 24 are then operated, and the milk valve 30 and the steam valve 38 are set to provide for appropriate ratios in the milk-steam mix eventually delivered by way of the mixing block 32.

Milk is delivered to the first inlet 28 of the Y-connector mixing chamber 31 by the pump 24, and steam is delivered from the steam boiler 18 to the second inlet 34 thereof. Preferably, the pumping force of the pump 24, and the steam pressure, are arranged such that the milk and steam supplied to the mixing chamber 31 are substantially of an equal pressure. The milk and steam are mixed together in the mixing chamber 31 and delivered to an outlet 54 thereof. The milk-steam mix is then fed to a frothing device generally indicated at 60. It will be appreciated that in mixing the milk with the steam, the milk is heated. Furthermore, as the milk is pumped and the steam is under pressure, the milk-steam mix is also pressurised.

The frothing device 60 is shown in more detail in FIG. 2. In this respect, the outlet 54 of the mixing chamber 31 is connected to feed the milk-steam mix to an inlet conduit 62. Similarly, the air conduit 20, which is controlled by the air valve 21, is connected to supply air to an air inlet conduit 64. It will be seen that, in the embodiment illustrated, the milk-steam inlet conduit 62 extends substantially at right angles to the air inlet conduit 64. The two conduits 62 and 64 extend within a froth block 66 having an inclined frothing chamber 68 extending therein in which a jet 70 is removably received. The froth block 66, with the jet 70, is preferably removably mounted on the mixing block 32.

The jet 70 has an outlet nozzle 72 within the frothing chamber 68. The jet 70 is arranged such that the milk-steam mix applied to the inlet conduit 62 is impressed into the jet 70 and exits from its outlet nozzle 72. It will be appreciated that as the milk-steam mix exits from the nozzle 72 it will expand and there will be emulsification thereof. Furthermore, the flow, under pressure, of the milk-steam mix from the nozzle 72 draws air into the mix by way of the air inlet conduit 64. Therefore, at the nozzle 72, there is an expanding milk-steam mix into which air is drawn with the result that a frothed product of milk, air and steam is produced at the nozzle 72.

The frothing device 60 further comprises a froth collection device 74 having an enlarged, generally conical froth collection chamber 76 connected to an outlet tube 78 which terminates in the discharge nozzle 12. The collection chamber 76 is arranged to receive the frothed product from the jet outlet nozzle 72. As the frothed product is produced, it collects within the collection chamber 76 and is then delivered by gravity by way of the tube 78 to the discharge nozzle 12. It has been found that delivering the frothed product by causing it to run within the chamber 76 and then allowing its subsequent delivery to the discharge nozzle 12 assists in the production and delivery of the emulsified mix. If required, the apparatus 10, may be used simply to deliver warmed milk at the discharge nozzle 12. In this application, the air valve 21 would be switched off to close the supply of air to the froth block 66.

The steam, which is provided to heat the milk, is also advantageously utilised to clean the apparatus between product deliveries. Thus, with the froth block 66 attached to the mixing block 32, the supply of both air and milk is prevented by closing the valves 21 and 30, but steam continues to be supplied, by way of the valve 38, to the inlet 34 of the mixing chamber 31. The steam will therefore travel to the outlet 54 and will clean the common parts of the mixing chamber 31. Similarly, the steam will clean the inlet conduit 62 of the frothing device, and the jet 70, particularly its outlet nozzle 72. If required, the jet 70 can be removed to be washed so that the steam then cleans the chamber 68 within the froth block 66.

It will be appreciated that for each production and delivery of frothed product, the volume of milk and steam supplied to the mixing chamber 31, and the pressure and the times of the supply, can be controlled by the controller 40, as can the temperature of the steam in the steam boiler 18. Furthermore, the supplies of milk and/or steam to the mixing chamber 31 may be continuous during a delivery or pulsed. In normal use, the volumes of steam and air applied to the mixing chamber 31 are controlled to provide a milk-steam mix at a suitable temperature for use in cappuccino coffee. In practice, the milk-steam mix is delivered at a temperature in the range from about 40° C. to about 83° C.

The present invention is particularly advantageous in that a continual hot frothed milk, air, steam mixture can be delivered at the nozzle 12 which is at a constant temperature and is produced in a readily controllable manner.

As regards the relative dimensions of the supply conduits and inlets and outlets, any appropriate dimensions can be provided in accordance with the required effect. In the illustrated example, the milk-air-steam is fed through the discharge nozzle 12 having a diameter in the region of 10 mm. The nozzle 72 of the jet 70 has a diameter of about 1 mm. The nozzle 72 thus forms an outlet jet wherein the pressure of bubbles within the mix is dependent upon the size of the jet aperture and also upon the milk pump and steam delivery pressure.

As mentioned above, the present invention is particularly advantageous in providing for effective control of the air volume, milk volume and steam volume as required and also the respective ratios thereof.

The invention is not restricted to the details of the foregoing illustrated embodiments. For example, the steam generation means and the pump means can be provided as part of any appropriate frothed milk supply system for supplying a milk-steam mix to any appropriate formation, such as any appropriate nozzle or chamber for creating the required frothed milk. The froth collection device 74 may be formed integrally with the froth block 66 or may comprise a releasable member which can be used as and when required. The tube carrying the discharge nozzle 12 may be provided in any particular shape and form, and apertures for receiving and delivering the frothed mixture may be provided a t any appropriate location in the tube. Furthermore, in place of the discharge nozzle 12, the outlet tube 78 may carry two or more discharge spouts.

It will be appreciated t hat other modifications and variations may be made to the embodiments described and illustrated within the scope of the present application.

I claim:

1. Apparatus for frothing milk, comprising:
   a mixing chamber having a first inlet for the supply of milk to the mixing chamber, a second inlet for the supply of steam thereto, and an outlet for discharging a milk-steam mix produced in the mixing chamber,
   a pump for supplying the milk to the first inlet of the mixing chamber,
   a frothing device in communication with said mixing chamber outlet to receive the milk-steam mix discharged from said mixing chamber,
   said frothing device having an air inlet arranged such that the milk-steam mix applied to the frothing device draws air into the frothing device whereby a frothed mixture of milk, steam and air is formed, and
   means for controlling at least one of temperature and pressure of the steam to be supplied to said second inlet of the mixing chamber.

2. Apparatus for frothing milk, comprising:
   a mixing chamber having a first inlet for the supply of milk to the mixing chamber, a second inlet for the supply of steam thereto, and an outlet for discharging a milk-steam mix produced in the mixing chamber,
   a pump for supplving the milk to the first inlet of the mixing chamber,
   a frothing device in communication with said mixing chamber outlet to receive the milk-steam mix discharged from said mixing chamber,
   said frothing device having an air inlet arranged such that the milk-steam mix applied to the frothing device draws air into the frothing device whereby a frothed mixture of milk, steam and air is formed, and
   means for controlling at least one of speed and force of the pump supplying the milk.

3. Apparatus for frothing milk, comprising:
   a mixing chamber having a first inlet for the supply of milk to the mixing chamber, a second inlet for the supply of steam thereto, and an outlet for discharging a milk-steam mix produced in the mixing chamber,
   a pump for supplying the milk to the first inlet of the mixing chamber,
   a frothing device in communication with said mixing chamber outlet to receive the milk-steam mix discharged from said mixing chamber,
   said frothing device having an air inlet arranged such that the milk-steam mix applied to the frothing device draws air into the frothing device whereby a frothed mixture of milk, steam and air is formed, and
   control means for controlling the supply of milk to the mixing chamber and the supply of air to the air inlet.

4. Apparatus as claimed in claim 1, 2 or 3 wherein the mixing chamber is defined by a Y-connection of first and second conduits for the milk and the steam.

5. Apparatus as claimed in claim 1, wherein the frothing device comprises a jet through which the milk-steam mix flows, and said air inlet opens at an outlet nozzle of the jet whereby air is taken into the milk-steam mix to produce an expanded and frothed mixture of milk, steam and air.

6. Apparatus as claimed in claim 5, wherein a frothing chamber is arranged at the outlet nozzle of the jet to receive the expanded and frothed mixture of milk, steam and air.

7. Apparatus as claimed in claim 1, wherein said frothing device comprises a jet through which the milk-steam mix flows, and a frothing chamber is arranged at the outlet nozzle of the jet, said air inlet opening in said frothing chamber.

8. Apparatus as claimed in claim 7, wherein said frothing chamber is disposed below said jet outlet, and a froth collection chamber communicating with an outlet tube is disposed, in use, below said frothing chamber.

9. Apparatus for frothing milk, said apparatus comprising a mixing chamber having a first inlet for the supply of milk to the mixing chamber, a second inlet for the supply of steam thereto, and an outlet for discharging a milk-steam mix produced in the mixing chamber, and a pump for supplying the milk to the first inlet of the mixing chamber, and said apparatus further comprising a frothing device in communication with said mixing chamber outlet to receive the milk-steam mix discharged from said mixing chamber, said frothing device having an air inlet arranged such that the milk-steam mix applied to the frothing device draws air into the frothing device whereby a frothed mixture of milk, steam and air is formed, said apparatus further comprising means for controlling the temperature and/or pressure of the steam to be supplied to said second inlet of the mixing chamber, means for controlling the speed and/or force of the pump supplying the milk, and control means for controlling the supply of milk to the mixing chamber and the supply of air to the air inlet.

10. Apparatus as claimed in claim 9, wherein said control means are operable to prevent the supply of milk and air thereby enabling steam applied to the second inlet to clean both the mixing chamber and the frothing device.

11. Apparatus as claimed in claim 9, further comprising a first conduit in communication with said first inlet for supplying milk to the mixing chamber, the first conduit having a valve member for controlling the flow of milk therethrough.

12. Apparatus as claimed in claim 9, further comprising a second conduit in communication with said second inlet for supplying steam to the mixing chamber, the second conduit having a valve member for controlling the flow of steam therethrough.

13. Apparatus as claimed in claim 9, further comprising an air inlet conduit in communication with the air inlet to the frothing device to supply air to the frothing device, the air inlet conduit having a valve member for controlling the airflow therethrough.

14. Apparatus as claimed in claim 11 or claim 12, wherein one or more of the said valve members comprises solenoid valve means.

* * * * *